(12) United States Patent
Fernandes et al.

(10) Patent No.: US 8,995,708 B2
(45) Date of Patent: Mar. 31, 2015

(54) APPARATUS AND METHOD FOR ROBUST LOW-COMPLEXITY VIDEO FINGERPRINTING

(75) Inventors: Felix C. Fernandes, Plano, TX (US); Karthikeyan S. Vadivel, Goleta, CA (US); Zhan Ma, Dallas, TX (US); Wang Lin Lai, Richardson, TX (US); Ankur Saxena, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 13/605,718

(22) Filed: Sep. 6, 2012

(65) Prior Publication Data

US 2013/0064417 A1 Mar. 14, 2013

Related U.S. Application Data

(60) Provisional application No. 61/532,440, filed on Sep. 8, 2011.

(51) Int. Cl.
*G06K 9/00* (2006.01)
*G06F 17/30* (2006.01)

(52) U.S. Cl.
CPC ...... *G06F 17/30784* (2013.01); *G06K 9/00751* (2013.01)

USPC ............................ 382/100; 382/173; 382/284

(58) Field of Classification Search
USPC .................................. 382/100, 173–180, 284
See application file for complete search history.

(56) References Cited

U.S. PATENT DOCUMENTS

| | | | |
|---|---|---|---|
| 5,835,498 A * | 11/1998 | Kim et al. ..................... | 370/537 |
| 2005/0175224 A1 | 8/2005 | Venkatesan et al. | |
| 2005/0273612 A1 | 12/2005 | Van Der Veen et al. | |
| 2006/0041753 A1 | 2/2006 | Haitsma | |
| 2007/0025631 A1* | 2/2007 | Kim et al. ..................... | 382/248 |
| 2010/0303282 A1 | 12/2010 | Boyd et al. | |

FOREIGN PATENT DOCUMENTS

| | | |
|---|---|---|
| JP | 2007-525064 A | 8/2007 |
| KR | 10-2006-0021121 A | 3/2006 |

* cited by examiner

*Primary Examiner* — Shefali Goradia
(74) *Attorney, Agent, or Firm* — Jefferson IP Law, LLP (57) ABSTRACT

An apparatus and method for video fingerprinting are provided. The method includes, for each frame of a video sequence including a plurality of frames, removing a portion of the frame, dividing a remaining portion of the frame into blocks, dividing each block into sub-blocks, computing a block level feature as a mean of pixels in each sub-block within the block, concatenating all block level features in the frame, and concatenating features of all frames in the video sequence.

8 Claims, 5 Drawing Sheets

APPARATUS AND METHOD FOR ROBUST LOW-COMPLEXITY VIDEO FINGERPRINTING

CROSS-REFERENCE TO RELATED APPLICATIONS

This application claims the benefit under 35 U.S.C. §119 (e) of a U.S. Provisional application filed on Sep. 8, 2011, in the U.S. Patent and Trademark Office and assigned Ser. No. 61/532,440, the entire disclosure of which is hereby incorporated by reference.

BACKGROUND OF THE INVENTION

1. Field of the Invention

The present invention relates to an apparatus and method for video fingerprinting. More particularly, the present invention relates to an apparatus and method for robust low-complexity video fingerprinting.

2. Description of the Related Art

In the last decade there has been a proliferation of digital videos attributed to advancements in video camera technology and the Internet. Copyright infringement and data piracy have recently become serious concerns for the ever growing video repositories. Videos on commercial sites are usually textually tagged and these tags provide little information to prevent copyright infringements.

Video content is distributed widely through various transport streams. During this distribution process, a video sequence may be altered, intentionally or otherwise, through various processes such as encoding artifacts, logo insertion, resizing, etc. When the video sequence arrives at a playback device for viewing, a mechanism for correct identification of the altered video is desirable for at least four reasons. First, content creators often invest large amounts of resources to create video sequences, including, for example, movies and television programs. Correct identification of altered videos can deter piracy, thus protecting the content creator's investment. Second, correct identification of altered videos enables improved parental control of viewed content by automatic blocking of videos identified as unsuitable for viewing by their children. Third, correct identification of altered videos allows automatic audience measurement for the identified video sequence. Fourth, correct identification of altered videos is a requirement of the Advanced Television Standards Committee (ATSC) 2.0 Standard for Internet Enhanced TV.

Several related art methods exist to allow video identification at a playback device. However, none of these related art methods provides correct identification robust to alterations. For example, textual tagging of video content is a simple method for video identification. A movie, for example, may have text tags attached which indicates the movie's title, director, writer, producer, studio, cast members, genre, etc. Unfortunately, the tags are often destroyed during the distribution process or by unscrupulous pirates, and have to be placed manually most of the times. This is not unexpected; pirates, for example, will take active steps to avoid their piracy being detected, and therefore will remove identifying tags when able to do so. Steganography is another video-identification method in which the identity is embedded obscurely within the video. For example, identification information may be hidden by using a least significant bit of each hundredth pixel of a key frame. Such a method of embedding information in a video would be essentially undetectable by the human eye. But this method is thwarted by alterations, particularly noise insertion.

Video fingerprinting is an identification method that survives noise attacks readily. This method consists of two stages. The first is the feature extraction stage where compact fingerprints/signatures are extracted from the video. This is followed by the matching stage where these signatures are matched against a database of copyright videos and the status of the query videos is determined. Below is a brief survey of the known related art in common feature extraction and matching algorithms, and their disadvantages.

In several video fingerprinting applications the first step is to identify key frames in a video. Key frames usually correspond to extrema in the global intensity of motion. But, key-frame selection algorithms are computationally intensive. Further, key-frame selection can be affected significantly by heavy artifacts such as severe compression or camera capture. Therefore, using the entire video sequence for video fingerprinting is preferred. The extracted features can either be global in the image domain, in the transform domain, or local in the image domain.

Global features like Scalable Color descriptor, Color Layout descriptor, and Edge histogram descriptor have been used in video-clip matching But in general, local image features are more robust to artifacts (video tampering/modification) which are localized, and hence are preferred to global features.

Compact Fourier Mellin Transform (CFMT) descriptor provides a concise and descriptive fingerprint for matching However, transforming the image frames to a different domain incurs significant computational complexity.

Local interest point based features such as Scale-Invariant Feature Transform (SIFT) and its compact version, Principal Component Analysis (PCA)-SIFT, have yielded promising results for the video fingerprinting problem. Interest point features are also expensive to generate. Here, the matching algorithm involves comparison of large number of interest point pairs without ordering which requires significant processing resources.

Low complexity local feature based algorithms for video fingerprinting such as Centroid of Gradient Orientations and Centroid of Gradient Magnitudes are popular, but gradient-based features are noise sensitive and are not robust to artifacts which affect the high frequency content of the video.

"Ordinal" features have also been used to obtain concise binary signatures for videos, but are again computationally intensive.

The Motion Picture Experts Group (MPEG)-7 video signature method has a simple feature extraction process, but its performance is primarily dependent on the pre-processing steps. This approach takes pre-determined pairs of blocks specifically trained to a video database, and may not work in other video databases.

There are several ways to compute the "distance" or difference between two fingerprints. Simple Euclidean distance is popular, but fails when the artifact is heavy and localized. More sophisticated distance measures like Hausdorff distance, partial Hausdorff distance, and its proposed variant outperform Euclidean distance when the query length is short. The final match is usually determined by comparing the distance obtained with a standard threshold. The Hausdorff based distance measures are computationally expensive, because they are designed to work well in even impractical cases where the frames are permuted. This matching technique is overkill for video fingerprinting, and its computational complexity overhead is not justified. Therefore, there is a requirement for a fingerprint distance measure which can be efficiently computed as well as robust to heavy artifacts which are localized in nature.

Further, in the feature extraction process, having low computational complexity is of paramount importance for practical applications. When a video fingerprinting algorithm has to be implemented in a portable device, even multipliers could impose a heavy computational penalty.

Accordingly, there is a need for an apparatus and method for robust, low-complexity video fingerprinting that can correctly identify a video, even after the video has experienced severe alterations.

SUMMARY OF THE INVENTION

Aspects of the present invention are to address at least the above-mentioned problems and/or disadvantages and to provide at least the advantages described below. Accordingly, an aspect of the present invention is to provide an apparatus and method for robust, low-complexity video fingerprinting.

In accordance with an aspect of the present invention, a method for robust, low-complexity video fingerprinting is provided. The method includes, for each frame of a video sequence including a plurality of frames, removing a portion of the frame, dividing a remaining portion of the frame into blocks, dividing each block into sub-blocks, computing a block level feature as a mean of pixels in each sub-block within the block, concatenating all block level features in the frame, and concatenating features of all frames in the video sequence.

In accordance with another aspect of the present invention, an apparatus for robust, low-complexity video fingerprinting is provided. The apparatus includes at least one processor and a feature extraction module for removing a portion of each frame of a video sequence including a plurality of the frames, for dividing a remaining portion of the frame into blocks, for dividing each block into sub-blocks, for computing a block level feature as a mean of pixels in each sub-block within the block, for concatenating all block level features in the frame, and for concatenating the features of all frames of the video sequence as a video fingerprint.

In accordance with yet another aspect of the present invention, a method of matching a query video fingerprint of a query video sequence with a video fingerprint of a plurality of pre-computed video fingerprints is provided. The method includes selecting a candidate video fingerprint from the plurality of pre-computed video fingerprints, determining a candidate clip of the candidate video fingerprint, computing a distance between the query video fingerprint and the candidate clip, if the distance is less than a predetermined threshold, determining that the query video sequence matches the candidate video fingerprint, and if the distance is not less than the predetermined threshold, determining a new candidate clip of the candidate video fingerprint for comparison by means of a sliding window.

In accordance with still another aspect of the present invention, an apparatus for matching a query video fingerprint of a query video sequence with a video fingerprint of a plurality of pre-computed video fingerprints is provided. The apparatus includes at least one processor and a fingerprint matching module for selecting a candidate video fingerprint from the plurality of pre-computed video fingerprints, for determining a candidate clip of the candidate video fingerprint, for computing a distance between the query video fingerprint and the candidate clip, for, if the distance is less than a predetermined threshold, determining that the query video sequence matches the candidate video fingerprint, and for, if the distance is not less than the predetermined threshold, determining a new candidate clip of the candidate video fingerprint for comparison by means of a sliding window.

In accordance with yet still another aspect of the present invention, a method for video fingerprinting is provided. The method includes, for each frame of a video sequence including a plurality of frames, removing a portion of the frame, dividing a remaining portion of the frame into non-overlapping blocks, for each block, computing gradients Gx in a horizontal axis and Gy in a vertical axis, computing a gradient magnitude G of the block as $G=abs(Gx)+abs(Gy)$, computing a gradient ratio GR as one of $GR=Gx/G$, $GR=Gy/G$, or $GR=w1*Gx/G+w2*Gy/G$, where w1 and w2 are weighted coefficients determined according to a block orientation such that $w1+w2=1$, and using GR as a video fingerprint of the video sequence.

In accordance with still yet another aspect of the present invention, a method of video fingerprinting in a video processing system is provided. The method includes receiving an input video clip, extracting a compact video fingerprint from the input video clip, accessing a video database including a plurality of pre-computed video fingerprints associated with known video clips, comparing the extracted video fingerprint with the plurality of pre-computed video fingerprints, determining whether the input video clip fingerprint is present in the video database, and identifying one of the known video clips that is most similar to the input video clip.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for robust, low-complexity video fingerprinting.

Figure 1:
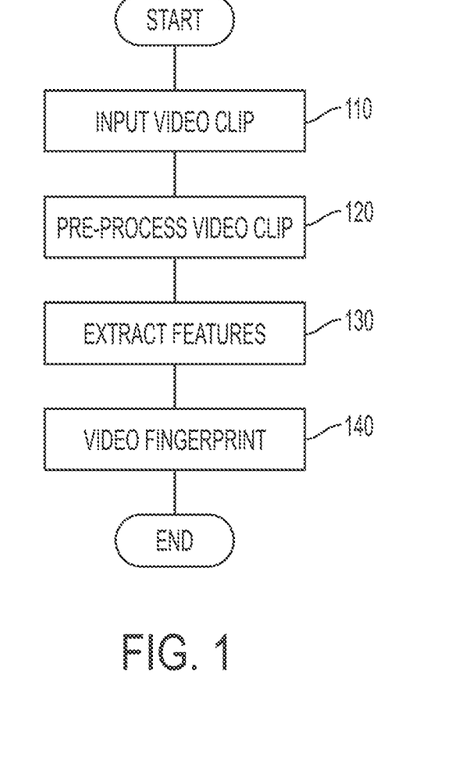
FIG. 1 is a high level block diagram of a video fingerprinting system according to an exemplary embodiment of the present invention.

FIG. 1 is a high level block diagram of a video fingerprinting system according to an exemplary embodiment of the present invention. Referring now to FIG. 1, in a typical video fingerprinting system, compact digests (fingerprints) of videos are first extracted, also called fingerprint extraction. A video clip is input at step 110. The video clip undergoes pre-processing at step 120. Features are extracted from the video clip at step 130. A video fingerprint according to the extracted features is determined at step 140.

It is assumed in this example that pre-computed fingerprints already exist for a database of videos. For example, a movie studio may maintain a database of video fingerprints for all movies they have produced or released. Given a query video clip, its fingerprint is extracted and then compared with the fingerprints present in the database. Finally, it is determined whether the query video clip is a part of the database or not, e.g., whether it is a sufficiently close match to any video fingerprint in the database, and identify the video clip in the database which is most similar to the query clip. This is the fingerprint matching stage.

Figure 2:
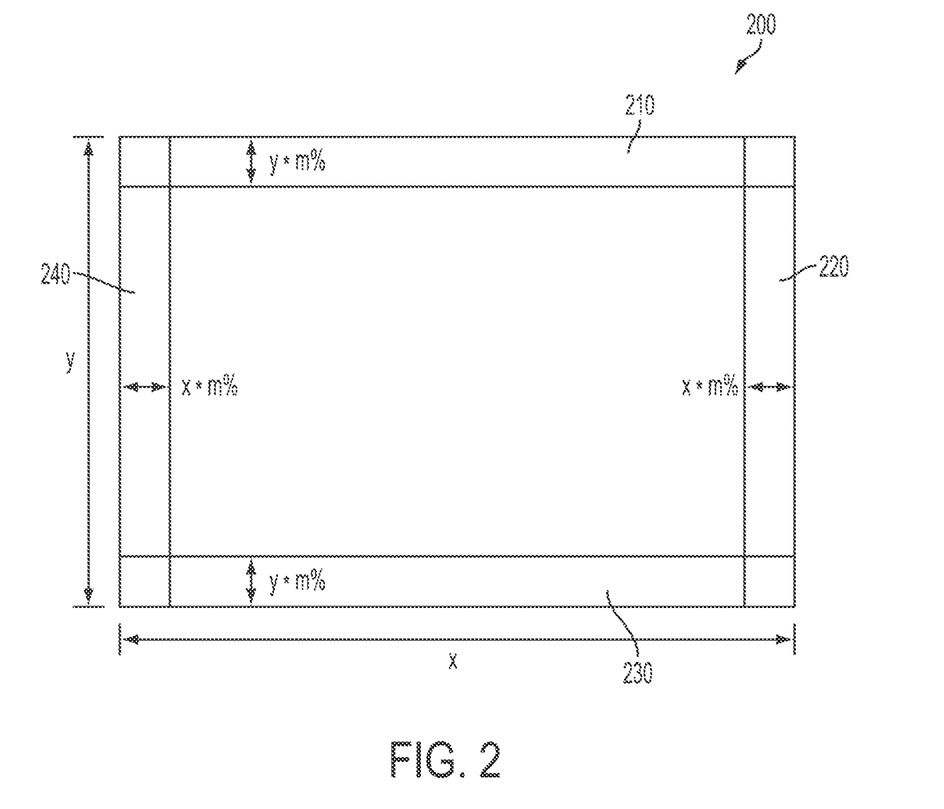
FIG. 2 is an example of margin removal according to an exemplary embodiment of the present invention.

FIG. 2 is an example of margin removal according to an exemplary embodiment of the present invention. Given a video clip 200, first, only a luminance component (Y) in a color space, such as YUV, is extracted (not shown). This is followed by pre-processing the frames by cropping out the margins 210, 220, 230, and 240. The margins 210, 220, 230, and 240 can be corrupted with padding artifacts, and therefore may often provide very little useful information, if any. A predetermined portion m % of the margin is removed on all the sides of a frame, as shown in FIG. 2; in this example, m=10%, so that 210 and 230 are each 0.1y, and 220 and 240 are each 0.1x, where x is a horizontal width of the frame and y is a vertical height of the frame. Although this example removes the margins of a frame, the present invention is not limited thereto. For example, corners might be removed if they are determined to be less likely to yield consistent and reliable video fingerprints.

In general, the margins 210, 220, 230, and 240 removed at the four sides (two vertical and two horizontal) of a frame can be up to four different values. After removing the margins 210, 220, 230, and 240, the remaining portion of the frame 200 is divided into rectangular blocks, and features are computed in all these blocks.

Figure 3:
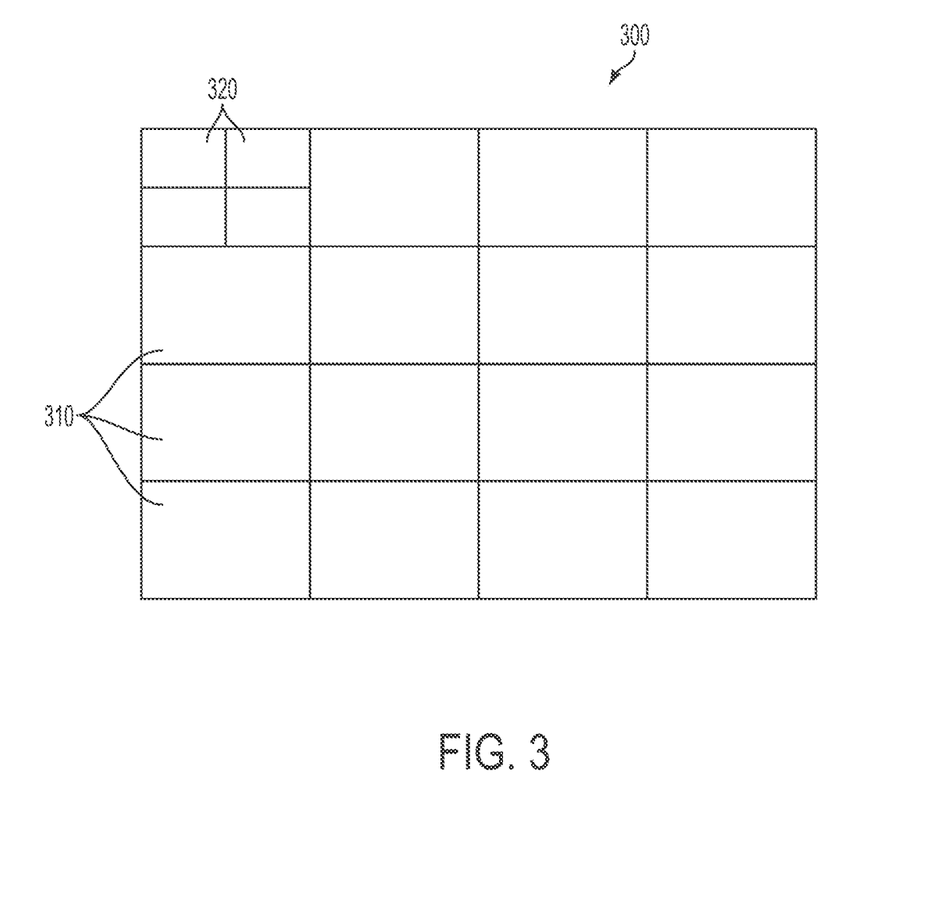
FIG. 3 is an example of 16 blocks in a frame and 4 sub-blocks within every block, according to an exemplary embodiment of the present invention.

FIG. 3 is an example of 16 blocks in a frame and 4 sub-blocks within every block, according to an exemplary embodiment of the present invention. For extracting the block level feature, every block 310 is divided into four sub-blocks 320 and the block level feature computed is the mean of every sub-block 320 within a block 310. In this example, the whole frame 300 is divided into 16 (4×4) blocks 310 with a same width and height as each other, and the blocks 310 are divided into 4 (2×2) sub-blocks 320 within every block 310, with a same width and height as each other, but the present invention is not limited thereto. Typically, the number of blocks 310 in a frame 300 can be m*n and the number of sub-blocks 320 can be p*q, where m, n, p, and q are each positive integers. Rectangular blocks and sub-blocks are thus easily determined with regard to rectangular frames. Although this example uses rectangular blocks, the present invention is not limited thereto; for example, blocks having other tessellated shapes could be used, such as hexagons. Tessellated shapes are preferred because it might not be possible to predict whether a gap includes important data, and overlapping shapes may cause an undesired increase in processing. However, the present invention is not limited to blocks having tessellated shapes.

The final video fingerprint is the concatenation of all the block level features in every frame 300, and eventually of all the frames in a video sequence. A video fingerprint according to an exemplary embodiment of the present invention is highly computationally efficient and compact, as it is only dependent on the first order statistic, the mean of the pixels in the sub-blocks 320 and blocks 310.

Figure 4:
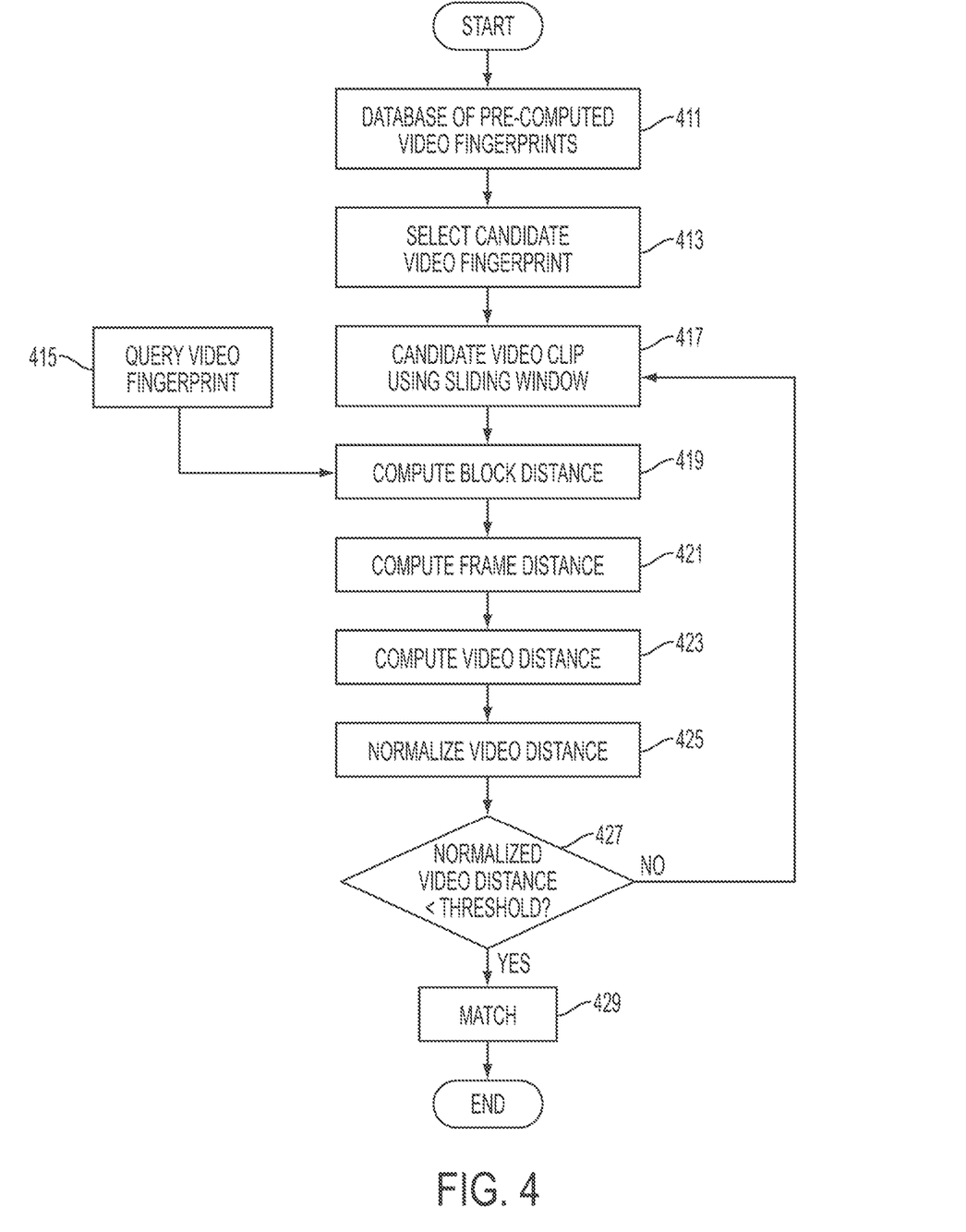
FIG. 4 is a high level block diagram of a fingerprint matching module according to an exemplary embodiment of the present invention.

FIG. 4 is a high level block diagram of an operation of a fingerprint matching module according to an exemplary embodiment of the present invention.

Referring now to FIG. 4, a database of pre-computed video fingerprints is prepared in step 411. A candidate video sequence is selected in step 413, and a query video and corresponding video fingerprint are determined in step 415. It must be determined whether a query clip is a modified version of a video clip in the candidate video sequence. Therefore, a sliding window approach is used in step 417 where a window size is determined exactly equal to the query video clip length in the candidate video, and it must be verified whether the query and the candidate video clip match. The sliding window technique of step 417 is described below in more detail with reference to FIG. 5. The match is determined by computing a distance measure between the candidate clip and the query clip using their video signatures. The final distance is obtained in three stages: a block distance is computed in step 419, a frame distance based on the block distances is computed in step 421, and a video distance based on the frame distances is computed in step 423. The video distance is normalized in step 425, and the normalized video distance is compared with a predetermined threshold in step 427. If the normalized video distance is less than the predetermined threshold, then it is determined in step 429 that the query video is a match to the candidate video sequence.

Figure 5:
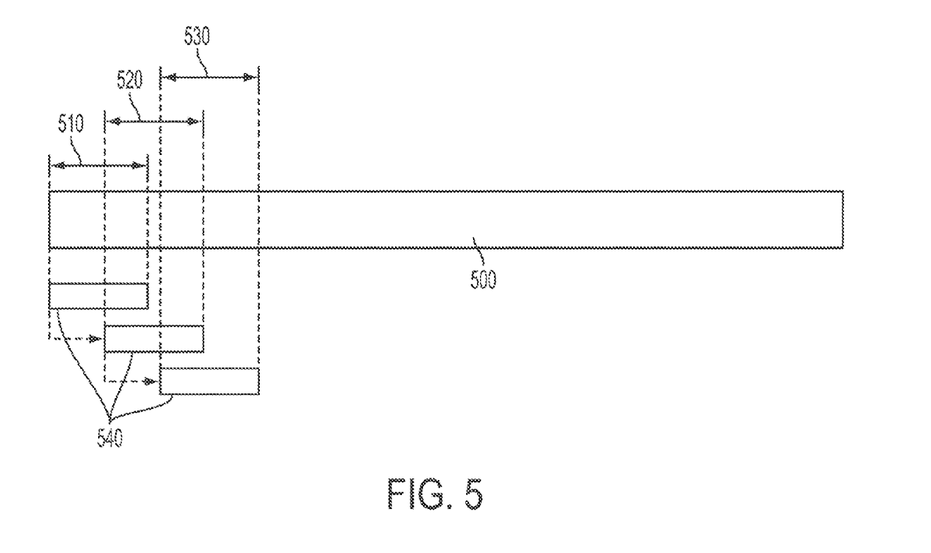
FIG. 5 is an example of a sliding window video fingerprint matching technique according to an exemplary embodiment of the present invention.

FIG. 5 is an example of a sliding window video fingerprint matching technique according to an exemplary embodiment of the present invention.

Referring now to FIG. 5, a candidate video fingerprint 500 is compared with a query video fingerprint 540 which is slid in time. The candidate clips 510, 520, 530, etc., are each of a same length as the query video fingerprint 540. The query video fingerprint 540 is compared to a candidate clip 510 of the candidate video fingerprint 500, then compared to a next candidate clip 520, then compared to a next candidate clip 530, and so on, such that each candidate clip 510, 520, 530, etc., is a portion of the candidate video fingerprint 500 having a same length as query video fingerprint 540, and having a later start point than the preceding candidate clip. In an exemplary embodiment of the present invention the candidate clips 510, 520, 530, etc. overlap; however the present invention is not limited thereto. For example, the sliding window may be candidate clips 510, 520, 530, etc. that do not overlap, and that give a roughly representative sample of candidate video fingerprint 500. In general, the smaller the increment is between the starting points of one candidate clip and the next, the greater the accuracy obtained, but at a cost of increased processing required. Thus, a larger time increment may be used with sliding windows that do not overlap on a first pass in order to determine which examples are more likely to yield a match upon closer comparison.

To compute the block distance in step 419, the popular metric Structural Similarity Index (SSIM) is desirable, which computes a perceptual similarity between a candidate clip block and a query clip block. The SSIM between two blocks X and Y can be mathematically written as a product of a mean factor and a co-variance factor by Equation 1.

$$SSIM(X, Y) = \left(\frac{2\mu_x\mu_y + C_1}{\mu_x^2 + \mu_y^2 + C_1}\right)\left(\frac{2\sigma_{xy} + C_2}{\sigma_x^2 + \sigma_y^2 + C_2}\right) \quad \text{Equation 1}$$

where $\mu_x$, $\sigma_x$ are the block mean and block variance of X, and similarly $\mu_y$, $\sigma_y$ are the block mean and block variance of Y. Here, $C_1$ and $C_2$ are constants, and may be small, so as to avoid divide by zero errors, with little effect on the computation otherwise. Note that $0 < SSIM(X,Y) < 1$. Also, $\sigma_{xy}$ is the co-variance between X and Y.

Unfortunately, SSIM cannot be used for video fingerprinting because the covariance between X and Y cannot be exactly computed by any feature extraction module in individual blocks, as the covariance computation requires all the pixels in a block. These features are computed independently in both the original and query blocks, and co-variance computation is impossible. To overcome this limitation of SSIM, and to apply a similar perceptual metric to Video Fingerprinting, the Perceptual Distance Metric (PDM) is defined as explained below.

First, every block is approximated by a group of sub-blocks as described earlier, and the appropriate $\sigma_x'$ $\sigma_y'$, and $\sigma_{xy}'$ are computed using the sub-block mean statistics. Let the sub-block means of block X be denoted by $\{\mu_x^{i}\}_{i=1 \ldots N_x}$, where $N_x$ denotes the number of sub-blocks in block X. Similarly, let the sub-blocks means of block Y be denoted by $\{\mu_y^{i}\}_{i=1 \ldots N_y}$. A first approximation of $\sigma_{xy}'$ is determined using the sub-block means. For the variance computations to be consistent with the co-variance computation above, $\sigma_x'$, and $\sigma_y'$ are computed using these sub-block means instead of the pixel values in the images directly. $\sigma_x'$, and $\sigma_y'$, and $\sigma_{xy}'$ are determined according to Equations 2, 3, and 4 below.

$$(\sigma_x')^2 = 1/N \sum_{i=1}^{N}(\mu_x^{i})^2 - 1/N^2(\sum_{i=1}^{N}(\mu_x^{i}))^2 \quad \text{Equation 2}$$

$$(\sigma_y')^2 = 1/N \sum_{i=1}^{N}(\mu_y^{i})^2 - 1/N^2(\sum_{i=1}^{N}(\mu_y^{i}))^2 \quad \text{Equation 3}$$

$$\sigma_{xy}' = 1/N \sum_{i=1}^{N}(\mu_x^{i})(\mu_y^{i}) - 1/N^2 \sum_{i=1}^{N}(\mu_x^{i})\sum_{i=1}^{N}(\mu_y^{i}) \quad \text{Equation 4}$$

Note that the block distance measure should have a small value when X and Y are similar and a large value when they are perceptually different. Therefore, the block perceptual distance metric (block PDM) is defined by Equation 5.

$$PDM(X, Y) = 1 - \left(\frac{2\mu_x\mu_y + C_1}{\mu_x^2 + \mu_y^2 + C_1}\right)\left(\frac{2\sigma_{xy}' + C_2}{\sigma_x'^2 + \sigma_y'^2 + C_2}\right) \quad \text{Equation 5}$$

This section also motivates the choice of sub-block means as features for every block, as it effectively approximates the SSIM based block distance metric which cannot be used for video fingerprinting. As an analogy, this can be viewed as a coarse-level quantization of the blocks to a particular value using the sub-block means.

The frame level distance is computed in step 421 by an order statistic (kth smallest value) of the block level distances $\{PDM(X_i,Y_i)\}_{i=1 \ldots n}$ where N is the number of blocks in a frame. This approach is computationally and storagewise efficient, as the number of blocks in a frame are limited. The selection algorithm computes the frame level distance from the block level distances. Order statistics are particularly robust to localized block level artifacts. For example, median based metric is robust to logo artifacts such as closed captions. However, when more than 50% of the blocks are affected by severe artifacts, median might not be a good choice. In exemplary embodiments of the present invention the rank of the order statistic is chosen such that heavily altered blocks will be ignored. For example, when 16 blocks are used, the rank is set as 7 (around the $40^{th}$ percentile).

The video level distance is computed in step 423 as the mean of all the block level distances. The number of frames in a video clip can be typically large and using a simple statistic such as the mean will reduce the overall matching computational complexity. Also, most practical artifacts affect the frames spatially and not temporally. Therefore, computing the mean measure of the frame level distances temporally is in general sufficient to compute the video-clip distance.

The video level distance is normalized in step 425. PDM is a perceptual similarity metric. Given a query clip, PDM only gives insight into the proximity between the candidate video clip signatures in the database and the query clip signature. It must still be determined whether they match by comparing it with a threshold. In some embodiments the threshold may need to be adapted to the query clip, as the absolute value of the PDM is not informative to determine a fixed threshold. Therefore, in an exemplary embodiment of the present invention, every query clip is compared with a small set of canonical videos different from the query clip in a database, and these canonical video distance values are used to normalize the distances computed with respect to candidate clips. The canonical video distances of a video clip 'q' to the canonical videos $\{c^i\}$ are represented by $d(q,c^i)_{i=1 \ldots M}$ where M is the number of canonical videos. The distance between the a query clip 'q' and a candidate clip 'p' represented by d(p,q) is normalized to obtain $d^n(p, q)$ by Equation 6:

$$d^n(p, q) = \frac{d(p, q)}{\left(\frac{\sum_{i=1}^{M} d(q, c^i)}{M}\right)} \quad \text{Equation 6}$$

The normalized distance described above improves an accuracy of the disclosed method; however, the present invention is not limited thereto. For example, the normalizing of the distance may optionally be included or excluded in exemplary embodiments of the present invention.

This step produces video distance values to typically lie around 1, match if the values are close to 0, and no-match if the values are close to 1. Note that there is very little extra computation added as a result of this normalization step.

In another exemplary embodiment of the present invention, the PDM, gradient-based, or other methods are applied to a low-resolution version of the query and original videos. The low-resolution version is obtained by lowpass filtering and downsampling of the original version. This imparts noise robustness and reduces computational requirements. Performance will be maintained or improved thereby because low-resolution versions are often sufficient to distinguish video sequences from each other.

In yet another exemplary embodiment of the present invention the query and candidate frame-level images are first split into non-overlapping blocks. For each block, the gradients in both horizontal and vertical axis are computed, i.e., the x- and y-dimensions, denoted as Gx and Gy. Therefore, the gradient magnitude of such a block is G=abs(Gx)+abs(Gy), and then the gradient ratio is calculated based on GR=Gx/G or GR=Gy/G or their weighted combination G=w1*Gx/G+ w2*Gy/G where weighted coefficients w1 and w2 can be determined by the block orientation, w1+w2=1. These gradient ratios can function as video fingerprints.

In still another exemplary embodiment of the present invention, Centroid of Gradient Operator (CGO) features can also be incorporated in the PDM framework. In CGO, after computing the gradients for each pixel (x,y), i.e., $G_x$ and $G_y$ in a Block B, the gradient magnitude is calculated as: $R_{xy} = \sqrt{G_x^2 + G_y^2}$ and the orientation of the images is calculated as: $\Theta_{xy} = \tan^{-1}(G_y/G_x)$. These are computed at each pixel level. Then the "mean" and "variance" of the gradient operator in "gradient domain" for Block B can be computed by Equation 7:

$$\mu_{G,B} = \text{Mean}(GO)_B = \frac{\sum_{x,y} R(x,y)\Theta(x,y)}{\sum_{x,y} R(x,y)}$$

$$\sigma^2_{G,B} = \text{Var}(GO)_B = \frac{\sum_{x,y} R(x,y)\{\Theta(x,y)\}^2}{\sum_{x,y} R(x,y)} - \mu^2_{G,B}$$

Equation 7

After computing the mean and variances of Gradient Operator for 2 blocks B and A, $\mu_{G,B}$, $\mu_{G,A}$, $\sigma^2_{G,B}$, $\sigma^2_{G,A}$, motivated by the PDM, the Gradient Operator factors can be computed by Equation 8:

$$S_\mu(B,A) = \frac{2\mu_{G,B}\mu_{G,A} + C_3}{\mu^2_{G,B} + \mu^2_{G,A} + C_3}$$

$$S_\sigma(B,A) = \frac{2\sigma_{G,B}\sigma_{G,A} + C_4}{\sigma^2_{G,B} + \sigma^2_{G,A} + C_4}$$

Equation 8

These factors, $S_\mu(B,A)$ and $S_\sigma(B,A)$ can be fused together, i.e., multiplied together to create two factors, and can be even multiplied with the block-means, block variances, and covariance factors (generating multiple factors) to augment the PDM and improve the overall performance of the video fingerprinting system.

In yet still another exemplary embodiment of the present invention, a combination of order statistics for computing the frame level distance is used. For example, instead of using rank-7 in the 16 blocks case, the average of 6, 7, and 8 ranks is used. In general, a combination of multiple order statistics to compute the frame distance measure can be used.

In another exemplary embodiment of the present invention, the PDM based technique is extended on a difference of blocks. The difference between the sub-block means across pairs of blocks can be used as the feature vector. This captures perceptual interblock relationships in the video fingerprint.

In yet another exemplary embodiment of the present invention, instead of using the variance, first order moments are used. This approach eliminates multiplies, and thus reduces the computational complexity significantly.

In still another exemplary embodiment of the present invention, a block level distance may be determined according to Equation 9, in which X is the block of the frame of the candidate clip and Y is the block of the frame of the query video sequence, D is a maximum pixel intensity, $\mu_x$ and $\mu_y$ are block means of X and Y, respectively, $\sigma_x^2$ and $\sigma_y^2$ are block variances of X and Y, respectively, and $\sigma_{xy}'$ is an approximation of a co-variance $\sigma_{xy}$ between X and Y.

$$PDM(X,Y) = (2D^3 - |\mu_x - \mu_y||\sigma_{xy}' - 0.5*(\sigma_x^2 + \sigma_y^2)|)$$

Equation 9

For example, if 8-bit data is used then D=256. Whereas in Equation 5, the PDM(X,Y) metric ranges from 0 to 1, the embodiment in Equation 9 achieves the same objective, but with the PDM(X,Y) metric ranging from 0 to $2D^3$: small values of the metric indicate that X and Y are similar, while large values show that they are dissimilar. This exemplary embodiment of the present invention eliminates the division, and thus reduces computational complexity.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for video fingerprinting by a processor, the method comprising:
   for each frame of a video sequence comprising a plurality of frames, removing a portion of the frame;
   dividing a remaining portion of the frame into blocks;
   dividing each block into sub-blocks;
   computing a block level feature as a mean of pixels in each sub-block within the block;
   concatenating all block level features in the frame; and
   concatenating features of all frames in the video sequence.

2. The method of claim 1, wherein the removed portion comprises margins on at least one side of the frame.

3. The method of claim 1, wherein the removed portion comprises at least one corner of the frame.

4. The method of claim 1, wherein the blocks and sub-blocks comprise a tessellated shape.

5. The method of claim 4, wherein the tessellated shape is a rectangle.

6. The method of claim 4, wherein the tessellated shape is a hexagon.

7. A video fingerprinting apparatus comprising:
   at least one processor; and
   a feature extraction module for removing a portion of each frame of a video sequence comprising a plurality of the frames, for dividing a remaining portion of the frame into blocks, for dividing each block into sub-blocks, for computing a block level feature as a mean of pixels in each sub-block within the block, for concatenating all block level features in the frame, and for concatenating the features of all frames of the video sequence as a video fingerprint.

8. A method for video fingerprinting by a processor, the method comprising:
- for each frame of a video sequence comprising a plurality of frames, removing a portion of the frame;
- dividing a remaining portion of the frame into non-overlapping blocks;
- for each block, computing gradients Gx in a horizontal axis and Gy in a vertical axis;
- computing a gradient magnitude G of the block as G=abs(Gx)+abs(Gy);
- computing a gradient ratio GR as one of GR=Gx/G, GR=Gy/G, or GR=w1*Gx/G+w2*Gy/G, where w1 and w2 are weighted coefficients determined according to a block orientation such that w1+w2=1; and
- using GR as a video fingerprint of the video sequence.

* * * * *